US009329846B1

(12) United States Patent
August et al.

(10) Patent No.: US 9,329,846 B1
(45) Date of Patent: May 3, 2016

(54) COOPERATIVE PROGRAM CODE TRANSFORMATION

(75) Inventors: David I. August, Princeton, NJ (US);
Kevin C. Fan, Lawrenceville, NJ (US);
Jae Wook Lee, Lawrenceville, NJ (US);
Scott A. Mahlke, Ann Arbor, MI (US);
Mojtaba Mehrara, Ann Arbor, MI (US)

(73) Assignee: Parakinetics Inc., Princeton, NJ (US)

( * ) Notice: Subject to any disclaimer, the term of this patent is extended or adjusted under 35 U.S.C. 154(b) by 671 days.

(21) Appl. No.: 12/951,470

(22) Filed: Nov. 22, 2010

Related U.S. Application Data

(60) Provisional application No. 61/283,106, filed on Nov. 25, 2009.

(51) Int. Cl.
*G06F 9/45* (2006.01)

(52) U.S. Cl.
CPC ...................... *G06F 8/443* (2013.01)

(58) Field of Classification Search
CPC ............................................ G06F 8/40–8/4443
USPC ........................... 717/101–178; 171/151–160
See application file for complete search history.

(56) References Cited

U.S. PATENT DOCUMENTS

| | | | | |
|---|---|---|---|---|
| 5,966,536 A * | 10/1999 | Ravichandran | ............... | 717/153 |
| 6,021,272 A | 2/2000 | Cahill et al. | | |
| 6,269,456 B1 | 7/2001 | Hodges et al. | | |
| 6,286,135 B1 * | 9/2001 | Santhanam | .................... | 717/146 |
| 6,625,807 B1 * | 9/2003 | Chen | .............................. | 717/154 |
| 6,745,384 B1 * | 6/2004 | Biggerstaff | .................... | 717/156 |
| 7,120,906 B1 * | 10/2006 | Stephenson et al. | .......... | 717/158 |
| 7,149,969 B1 * | 12/2006 | Thrane | .......................... | 715/255 |
| 7,159,036 B2 | 1/2007 | Hinchliffe et al. | | |
| 7,185,337 B2 * | 2/2007 | Stoodley et al. | .................. | 718/1 |
| 7,197,748 B2 * | 3/2007 | Chaiken | ..................... | G06F 8/52 717/136 |
| 7,418,699 B2 * | 8/2008 | Metzger et al. | ................ | 717/162 |
| 7,730,470 B2 * | 6/2010 | Sharapov | ............ | G06F 12/0862 717/140 |
| 8,024,718 B2 * | 9/2011 | Miranda et al. | ................ | 717/152 |
| 8,087,010 B2 * | 12/2011 | Eichenberger et al. | ........ | 717/150 |
| 8,122,442 B2 * | 2/2012 | Lin | ............................... | 717/159 |
| 8,356,165 B2 * | 1/2013 | Tye | ........................ | G06F 8/4441 712/226 |
| 8,407,675 B1 * | 3/2013 | Clark | ......................... | G06F 8/53 717/131 |
| 8,752,008 B2 * | 6/2014 | Herdeg | ............... | G06F 9/45525 707/713 |
| 2002/0066088 A1 * | 5/2002 | Canut et al. | .................... | 717/151 |
| 2002/0138748 A1 * | 9/2002 | Hung | ............................ | 713/190 |
| 2004/0010782 A1 * | 1/2004 | Moritz | .......................... | 717/151 |
| 2004/0194073 A1 * | 9/2004 | Chan et al. | ..................... | 717/151 |
| 2005/0010891 A1 * | 1/2005 | Chaiken et al. | ................ | 717/100 |
| 2006/0048115 A1 * | 3/2006 | Tal et al. | ........................ | 717/151 |
| 2006/0143601 A1 * | 6/2006 | Concha et al. | ................. | 717/170 |

(Continued)

OTHER PUBLICATIONS

BIRD: Binary Interpretation using Runtime Disassembly—Susanta Nanda, Wei Li, Lap-Chung Lam, Tzi-cker Chiueh—Department of Computer Science SUNY at Stony Brook—Proceedings of the International Symposium on Code Generation and Optimization—2006.*

(Continued)

*Primary Examiner* — Francisco Aponte
(74) *Attorney, Agent, or Firm* — Van Pelt, Yi & James LLP

(57) ABSTRACT

Cooperative program code transformation includes receiving a transformation hint request, obtaining a suitable transformation hint, and providing the suitable transformation hint such that it is used to transform at least a portion of the program code and generate optimized code.

33 Claims, 9 Drawing Sheets

(56) References Cited

U.S. PATENT DOCUMENTS

| | | | | |
|---|---|---|---|---|
| 2006/0277532 | A1* | 12/2006 | Barraclough | G06F 8/52 717/137 |
| 2007/0079304 | A1* | 4/2007 | Zheng | G06F 9/45516 717/151 |
| 2007/0226717 | A1* | 9/2007 | Shtilman et al. | 717/151 |
| 2007/0240135 | A1* | 10/2007 | Stoodley et al. | 717/140 |
| 2008/0172662 | A1* | 7/2008 | Harris et al. | 717/159 |
| 2008/0229294 | A1* | 9/2008 | Tal | 717/151 |
| 2008/0271004 | A1* | 10/2008 | Choi | G06F 8/61 717/151 |
| 2009/0313615 | A1* | 12/2009 | Joshi et al. | 717/154 |
| 2010/0122328 | A1* | 5/2010 | Betzler et al. | 726/6 |
| 2010/0153934 | A1* | 6/2010 | Lachner | 717/146 |
| 2011/0066829 | A1* | 3/2011 | Tye et al. | 712/226 |

OTHER PUBLICATIONS

A Model for Self-Modifying Code—Bertrand Anckaert, Matias Madou, and Koen De Bosschere—Ghent University, Electronics and Information Systems Department Sint-Pietersnieuwstraat 41 9000 Ghent, Belgium—2007.*

Optimizing Embedded Applications Using Programmer—Inserted Hints—G Chen and M. Kandemir—Department of Computer Science and Engineering, The Pennsylvania State University, University Park, PA—2005 IEEE.*

Rangan et al., "Decoupled Software Pipelining with the Synchronization Array," Department of Computer Science, Princeton University, 2004.

* cited by examiner

```
                602                                     604
                  \                                     / cmpl    $0x32, %ebx        0x40114d: cmp    $0x32,%ebx
        jg      L9                 0x401150: jg     401164 <_main+0x64>
        cmpl    $0x32, %ebx        0x401152: cmp    $0x32,%ebx
        jle     L10                0x401155: jle    401172 <_main+0x72>
LC1:                               0x401157: cmp    %dh,(%ebx)
        .ascii  "83c206\0"         0x401159: arpl   %si,(%edx)
LC2:                               0x40115b: xor    %dh,(%esi)
        .ascii  "83c201\0"         0x40115c: add    %bh,(%eax)
L9:                                0x40115e: xor    0x32(%ebx),%esp
        movl    $LC1, (%esp)       0x401161: xor    %dh,(%ecx)
        call    _printf            0x401163: add    %al,%bh
        jmp     L90                0x401165: add    $0x24,%al    |   movl
L10:    movl    $LC2, (%esp)       0x401167: push   %esi         | <- instruction
        call    _printf            0x401168: adc    %eax,0x0(%eax) |   missing
                                   0x40116b: call   401230 <_printf>
                                   0x401170: jmp    40118c <_main+0x8c>
                                   0x401172: movl   $0x40115d,(%esp)
                                   0x401179: call   401230 <_printf>
```

FIG. 6

```
int abs(int x)
{
   return (x>=0) ? x : (-x);
}
```
~ 702

```
0x40052c: push   %rbp              0x40052c: push   %rbp
0x40052d: mov    %rsp,%rbp         0x40052d: mov    %rsp,%rbp
0x400530: mov    %edi,-0x4(%rbp)   0x400530: mov    %edi,-0x4(%rbp)
0x400533: cmpl   $0x0,-0x4(%rbp)   0x400533: cmpl   $0x0,-0x4(%rbp)
0x400537: js     400541 <abs+0x15> 0x400537: js     400541 <abs+0x15>
0x400539: mov    -0x4(%rbp),%eax   0x400539: mov    -0x4(%rbp),%eax
0x40053c: mov    %eax,-0x8(%rbp)   0x40053c: mov    %eax,-0x8(%rbp)
0x40053f: jmp    40054b <abs+0x1f> 0x40053f: jmp    40054b <abs+0x1f>
0x400541: mov    -0x4(%rbp),%eax   0x40054b: mov    -0x8(%rbp),%eax
0x400544: mov    %eax,%edx         0x40054e: leaveq
0x400546: neg    %edx              0x40054f: retq
0x400548: mov    %edx,-0x8(%rbp)
0x40054b: mov    -0x8(%rbp),%eax                          ~ 706
0x40054e: leaveq
0x40054f: retq
                ~ 704
```

FIG. 7

COOPERATIVE PROGRAM CODE TRANSFORMATION

CROSS REFERENCE TO OTHER APPLICATIONS

This application claims priority to U.S. Provisional Patent Application No. 61/283,106 entitled MECHANISM FOR COOPERATIVE BINARY OPTIMIZATION filed Nov. 25, 2009 which is incorporated herein by reference for all purposes.

BACKGROUND OF THE INVENTION

Providing low-cost, effective, and correct optimizations for speeding up applications has always been a challenge in computing systems. Traditionally, optimizations are performed at development time by the original developers and the final product is shipped to the client in the form of binary executables. Many advanced optimization techniques, however, are difficult to do statically at development time because of the lack of dynamic run-time information. In addition, many existing applications are no longer under development and therefore preclude any development time optimization.

Some dynamic translation and optimization tools have been developed which are capable of monitoring the run-time behavior of the application and changing the execution of the code by adding, removing, or changing the code during runtime. Such tools often have a number of limitations. The tools typically can only achieve a partial understanding of the run-time behavior of the application, and thus the extent of the tools' performance and applicability is often limited. Many optimizations require programmer knowledge and cannot be easily discovered by the tools. The overhead of obtaining behavior information often has significant impact on the performance of the program.

BRIEF DESCRIPTION OF THE DRAWINGS

Various embodiments of the invention are disclosed in the following detailed description and the accompanying drawings.

FIG. 6 illustrates an example where the static disassembly is missing an instruction.

FIG. 7 is a code diagram illustrating an example where the dynamic trace is missing an instruction.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cooperative program code transformation is disclosed. The technique employs a client-server architecture, where transformation hints for a set of program code are generated on the server side and provided to the client. Using the hints, the client can more effectively perform transformations such as disassembly and optimization to improve certain attributes of the original program, such as increasing execution speed of at least a portion of the code, reducing the code size, reducing the amount of power consumed, etc. The transformation does not necessarily result in code that is optimal in all aspects since there are often tradeoffs to be made. For example, increased execution speed may result in larger code size and/or greater power consumption in some cases. As used herein, optimization refers to improvements in certain aspects or properties of the original code.

Figure 1:
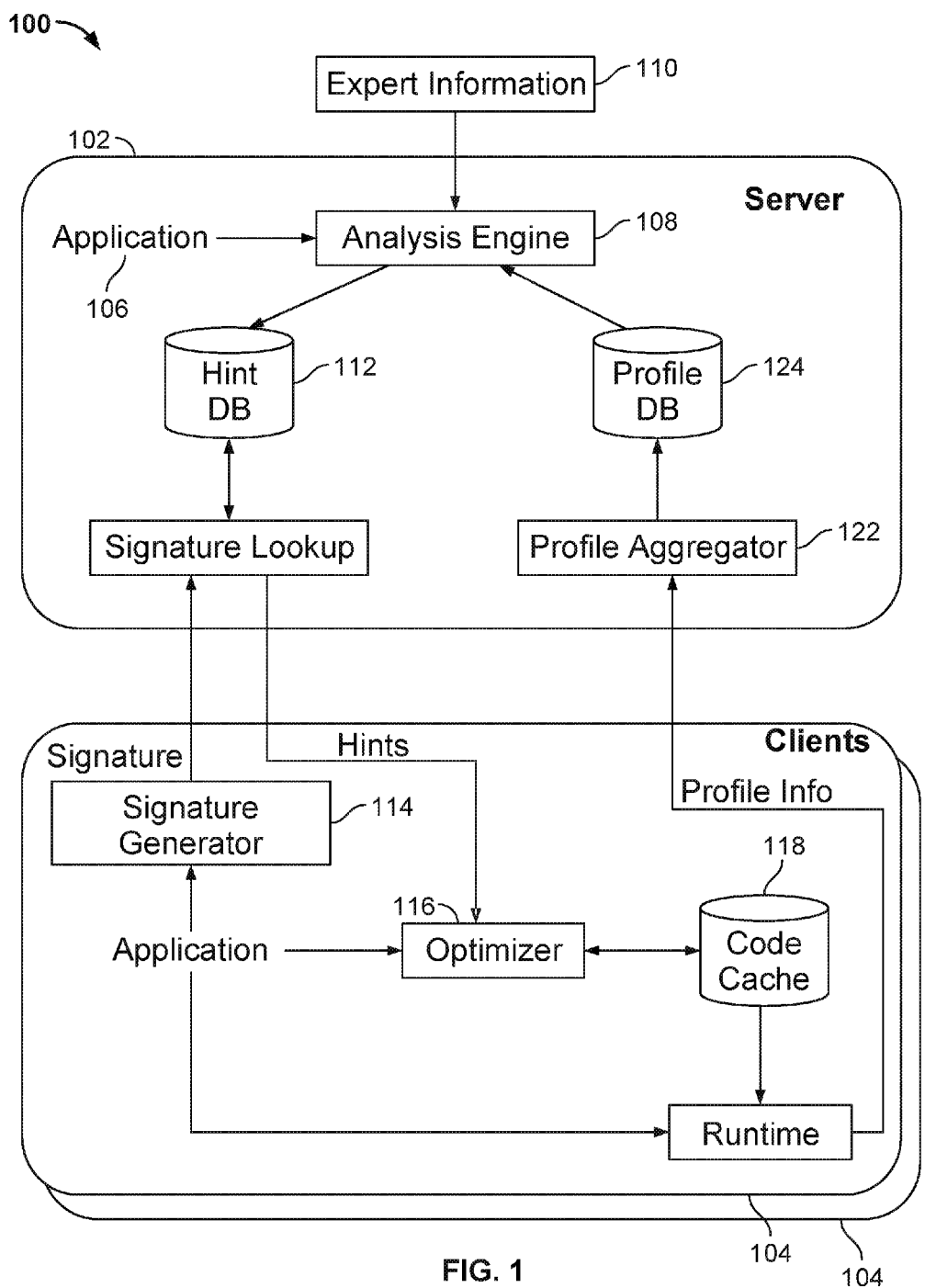
FIG. 1 is a block diagram illustrating an embodiment of a cooperative program code optimization architecture.

FIG. 1 is a block diagram illustrating an embodiment of a cooperative program code transformation architecture. In this example, platform 100 includes a server 102 and one or more clients 104. The client may be implemented using computing devices such as a personal computer, a handheld or portable device, a flat panel device, a multi-processor system, a microprocessor based system, a set-top box, a programmable consumer electronic device, a network PC, a minicomputer, or any other appropriate computing device, a large-scale computer, a special purpose device, a distributed computing environment including any of the foregoing systems or devices, or other hardware/software/firmware combination that includes one or more processors, and memory coupled to the processors and configured to provide the processors with instructions. The server may also be implemented using any appropriate computing device or hardware/software/firmware combination.

In this example, the server and client(s) cooperate to transform a set of application code 106, which includes binary code. The application code is transformed on the client side, utilizing application specific hints provided by the server. The transformations include binary disassembly and compiler optimization. On the server side, computationally intensive techniques such as extensive application profiling and analyses are performed in an analysis engine 108 to obtain information for improving the quality of the transformations. In addition, expert information 110 is optionally sent to the analysis engine by expert users. Examples of the expert information include manual identification of hot regions of code and information about how to tune these hot regions. The analysis engine is configured to incorporate the expert input in the analysis. The results of the analysis engine, which are used by the client to facilitate the transformation of the application on the client side, are referred to as application-specific transformation hints. A hint may indicate how to perform disassembly and/or an optimization in the set of code, a property of the code for purposes of making an optimization, etc. Examples of transformation hints include address hints indicating addresses of loops that can be optimized, disassembly hints indicating which addresses correspond to instructions in the program code, parallelization hints indicating how to make code run in parallel threads, broken dependencies hints indicating which dependencies may be ignored, etc. An application may have one or more application-specific transformation hints. As shown in the diagram, the transformation hints are stored in hint database 112, which may reside on the server device or on one or more separate devices.

The amount of information included in the hints varies in different embodiments. More information in the hints means less work is required on the client side; therefore, the client-side tool can be simpler. Embodiments of the invention balance hint size and client-side complexity, capitalizing on the strengths of both client-side and server-side analyses. Since the server typically has more computing power than the client, heavy-weight analyses including manual annotation and optimization by a human developer are performed offline on the server side. The results of such analyses are distilled into hints sent to the client, allowing the client tool to replicate the server-side transformation. In some embodiments, hints for transformations that can be performed by the client with local knowledge are not sent to the client.

An application has a unique (or nearly unique) signature that is derived based on the properties of the application, such as name, version, size, vendor, platform for running the application, etc. Techniques such as secure hash are used to generate the signature for each application. The signature is used as an index or key for storing the transformation hints of an application in the database. When a client is ready to optimize an application, a signature is generated by signature generator 114 based on the properties of the application. The client queries the server using the signature. The server looks up the signature in the hint database to locate the corresponding application-specific hints and returns the found hints to the client.

As will be described in greater detail below, the client's optimizer 116 uses the received hints to perform optimization. In the example shown, the optimized code is stored in a code cache 118 so that it may be reused by later execution. The example shows an interpreted environment (e.g., Java) in which the application code is interpreted at runtime into machine code that runs on the processor. The runtime environment checks for any optimized code section in the code cache while running the application by, for example, checking the program counter (PC) of the instructions being executed and determining whether the PC exists in the code cache.

In the example shown, the clients optionally provide feedback information to the server to further improve the analyses and optimization processes. Examples of the feedback information include profile information such as memory dependence information (such as rate of dependences manifesting during execution), basic block execution counts, control flow information about branching of the code, and other runtime statistics useful for optimization. The clients execute the application, collect profile information, and feedback the collected information. In some embodiments, a single client executes the code multiple times to provide feedback information. A profile aggregator 122 aggregates the feedback information, storing it in a profile database 124. The aggregation of feedback information from multiple clients and/or multiple executions provides more complete statistical coverage since different clients/execution runs tend to execute the application under different conditions, and therefore can provide different types of dynamic information. It also allows the individual client to collect runtime information in a light weight fashion without significantly impacting performance.

In some embodiments, the hint database is populated offline (i.e., independent of processing incoming client requests). The analysis engine disassembles, analyzes, and optimizes the program code and adds resulting hints to the hint database. The hints are indexed or keyed by the program code's corresponding signature. If aggregated profile information is available, it is incorporated into the analysis process. When new hints for a new application or an existing application should be added to the database, the analysis process is repeated and new hints are added to the hint database.

Figure 2:
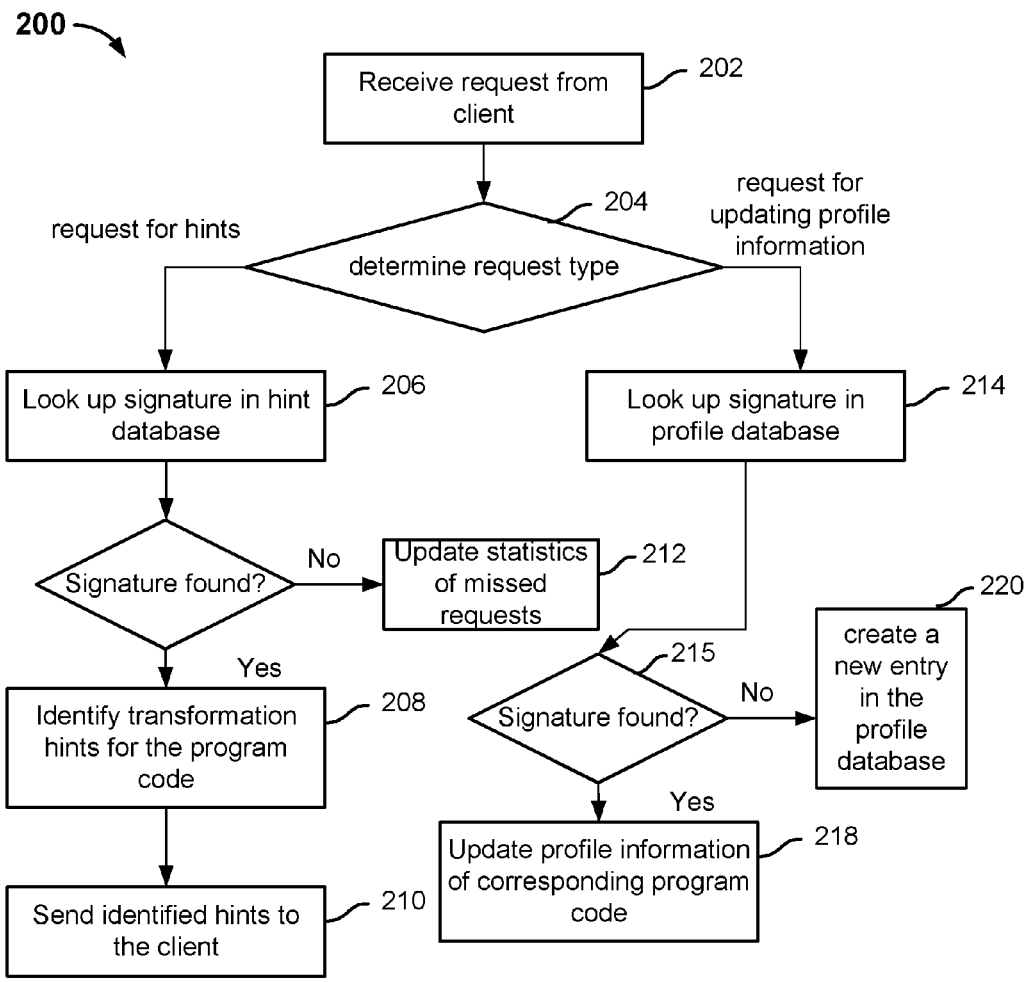
FIG. 2 is a flowchart illustrating an embodiment of a server-side process for performing cooperative program code optimization.

FIG. 2 is a flowchart illustrating an embodiment of a server-side process for performing cooperative program code optimization. The process may be implemented on a server such as 102.

At 202, a request is received from the client. At 204, the type of request is determined. In the example shown, two types of request are possible: request for transformation hints and request for updating profile information.

The client sends a request for transformation hints when it is ready to optimize a specific set of program code such as an application. The optimization hint request includes a signature that corresponds to the set of program code. If the received request is deemed to be a request for transformation hints, the server obtains one or more suitable transformation hints by identifying them in the hint database, deriving them directly, and/or receiving them from a human expert. The server provides the identified hints such that they are used by the client to transform at least a portion of the set of program code and generate a set of optimized code. Specifically, in the example shown, at 206, the signature is looked up in the hint database. If the signature exists in the database, at 208, the corresponding transformation hints for the program code are identified. At 210, the identified hints are sent to the client to be optimized. If, however, the signature is not found, at 212, the server optionally tracks such an event. The statistics of requested but non-existent hints are used to guide future offline analysis and optimization. In some embodiments, if the number of missed hint requests for a set of code with a certain signature exceeds a threshold, the server will attempt to generate hints for the code.

The client sends a profile update request when it has executed a set of program code and obtained profile information. The profile update request includes the signature that corresponds to the set of program code, as well as profile information for facilitating optimization. If, at 204, it is determined that the received request is a profile update request, the server updates the profile database with information included in the request. At 214, the signature is looked up in the profile database. At 215, it is determined whether the signature is found. If the signature exists in the database, at 218, the corresponding program code's profile information is updated based on the received profile information. If, however, the signature is not found in the profile database, a new entry representing the profile information of a set of program code that corresponds to the signature is created at 220.

Figure 3:
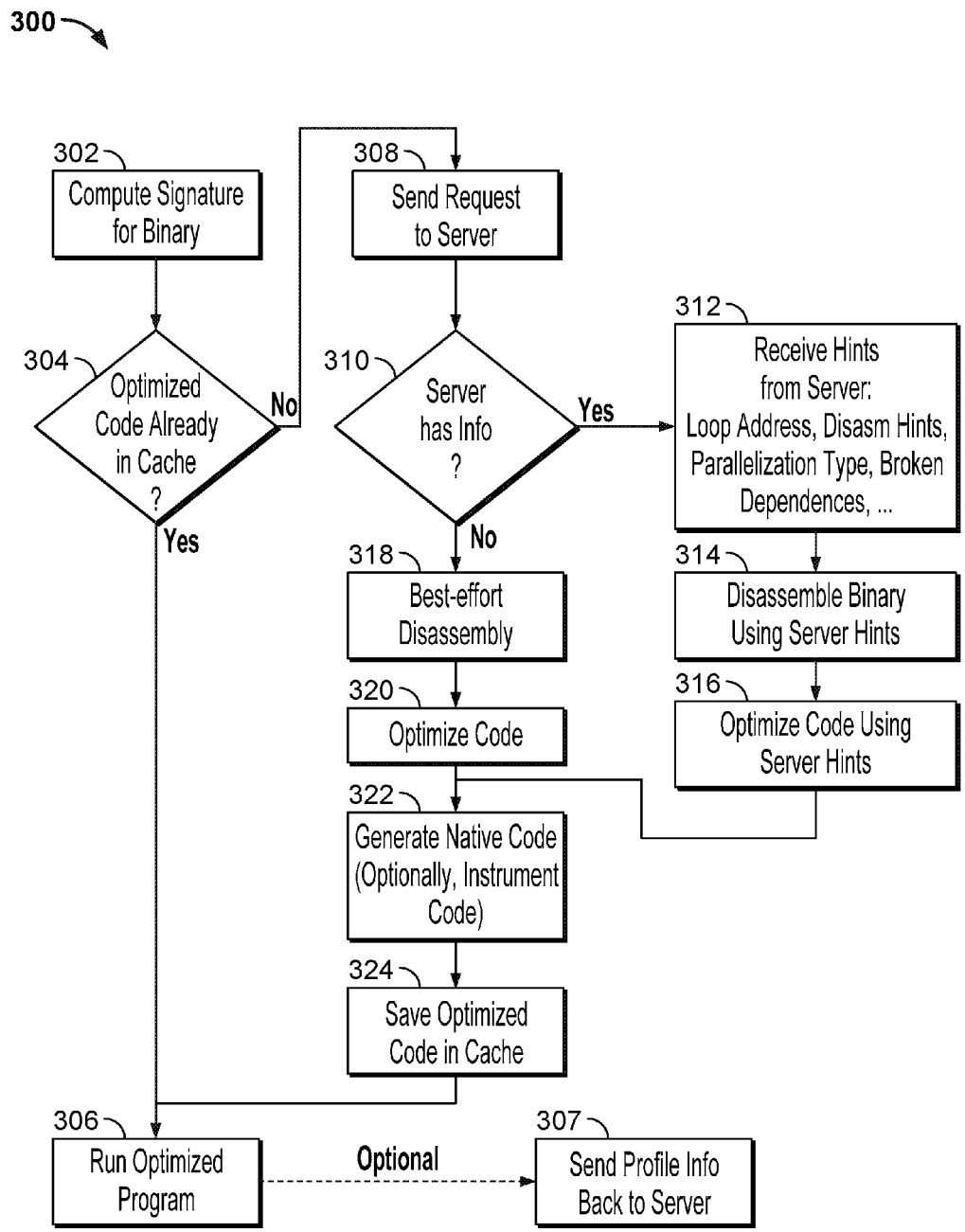
FIG. 3 is a flowchart illustrating an embodiment of a client-side process for performing cooperative program code optimization.

FIG. 3 is a flowchart illustrating an embodiment of a client-side process for performing cooperative program code optimization. Process 300 may be implemented on a client such as 104. In this example, the client implements a code cache for temporarily storing optimized program code that is indexed according to the corresponding signature. When the user or the system is ready to run an optimized program, at 302, the signature of the program code is generated based on the program binary, using the same signature generating technique as the server. At 304, the signature is looked up in the code cache to locate cached optimized program code. If the optimized code exists in the code cache, it is retrieved and executed by the client at 306. Profiling of the optimized code and feeding back the profile information to the server are optionally performed at 307. If, however, the optimized code is not found in the code cache, control is transferred to 308, where a request for transformation hints is sent to the server. At 310, the server processes the transformation hints request and determines whether it has transformation hints information, using a process similar to 200.

On the client, the client-side tool starts with the original binary without any additions or modifications. This binary is to be disassembled, transformed, and executed. During application run-time on the client, the original binary remains in memory to serve as a backup.

If the hints are not available on the server, the client performs best-effort disassembly without the benefit of disassembly hints, at 318. The code is optimized without additional transformation hints, at 320. The process continues at 322, where native code is generated and the code is optionally instrumented. The optimized code is saved in code cache at 324.

If the hints are available on the server, they are returned to the client. Accordingly, once the hints are received on the client at 312, the client uses the transformation hints to perform transformation of the code, generating a set of optimized code. In this example, the transformation includes disassembling the binary program code to generate assembly code or machine instructions and optimizing the disassembled code. A typical static disassembler is not guaranteed to generate the correct output, due to the presence of complexities such as intermixed code and data, indirect jumps, etc. Thus, in the example shown, at 314, the client uses the hints in disassembly to guide the disassembler in generating correctly disassembled output. At 316, the client optimizes the disassembled code, including identifying memory dependencies and parallelizing portions of the program to run in parallel threads on multiple cores. Details of the disassembly and the optimization processes are discussed below.

During runtime, the client-side tool has access to both the transformed parts of the program code and the entire original program code. Execution of the transformed parts of the code is usually faster/more efficient than execution of the original code. The original code provides backup for when control leaves the transformed region.

Process 300 continues at 322, where native code is generated. Optionally, the client-side optimizer is configured to instrument the code in such a way that as the program runs, statistics are collected about dynamic characteristics of the program. Examples of such characteristics include basic block execution counts and memory dependence profiles. These statistics are then sent back to the server, which aggregates profile information for a given application from multiple clients and saves it for use in offline analysis. This instrumentation is possible regardless of whether the program was otherwise successfully optimized. As such, the feedback can serve both as a measure of how successful an existing optimization is and a guide for future optimization of applications previously unseen by the server.

The client-side profiling preferably has low-overhead, so as not to slow down the application and negate any performance gains from optimization. The client-server model provides a unique opportunity in this respect, since the model allows a large number of clients to provide high profile coverage while keeping runtime overheads low on the individual clients. Using multiple clients to provide profile information can be accomplished in different ways depending on the particular attribute being measured. For example, for memory dependence profiling, it is possible to subdivide the space of addresses that must be checked. Each client only needs to check a subset of memory dependences, thus greatly reducing the performance penalty of memory profiling.

At 324, the optimized code is saved in the code cache so that it will be available again later. The process continues at 306, where the optimized program is run, and any optionally generated profile information is sent back to the server at 307.

As discussed above in connection with step 314, one use of the hints is to aid code disassembly on the client. Application optimizers with no access to the source code usually employ binary code disassembly to translate machine code into assembly code. Conventional static disassembly often cannot reliably disassemble all the program code due to lack of knowledge about the exact location of all the code during execution. Examples of code that may lead to different code location during runtime include indirect jumps, non-executable data (e.g., jump tables, data strings, alignment bytes, etc.) in the middle of executable instruction flow, and self-modifying code. For example, if the destination of an indirect jump instruction depends on some runtime condition, then a conventional static disassembler would not be able to predict the destination address before the instruction is executed and therefore would not be able to reliably disassemble the code instruction. Moreover, the conventional static disassembler may produce incorrect results silently, without causing any obvious exceptions.

Embodiments of the cooperative code optimization architecture implement several approaches for handling unknown code locations during execution. The same static disassembler runs on the server and the client and hints are generated based on information obtained from the server side disassembler. Using the hints, the client side static disassembler can successfully disassemble the program code, taking into account the location of code that was previously unknown.

The hints are generated as follows: in some cases, it is possible to determine, before the code is executed, where the statically disassembled code will be out of sync (i.e. have mismatches with the dynamic traces of the executed code) and how to get the statically disassembled code back in sync. For example, if the destination of an indirect jump instruction depends on some runtime condition, the statically disassembled code may be out of sync at the target of the indirect jump instruction. The determination is preferably made on the server side. In such cases, the server may be able to determine the possible targets of the jump instruction and convey this information to the clients in the hints. Based on hints about out of sync locations, the client-side disassembler can successfully disassemble program code. In some cases, however, it is not possible to know ahead of time how to bring the disassembler back in sync. An example of such a case is self-modifying code. In such cases, the hints include information about which regions of code are likely to be self-modifying. Given the hints, the client-side disassembler can ignore those regions in subsequent transformations and successfully disassemble program code.

Figure 4:
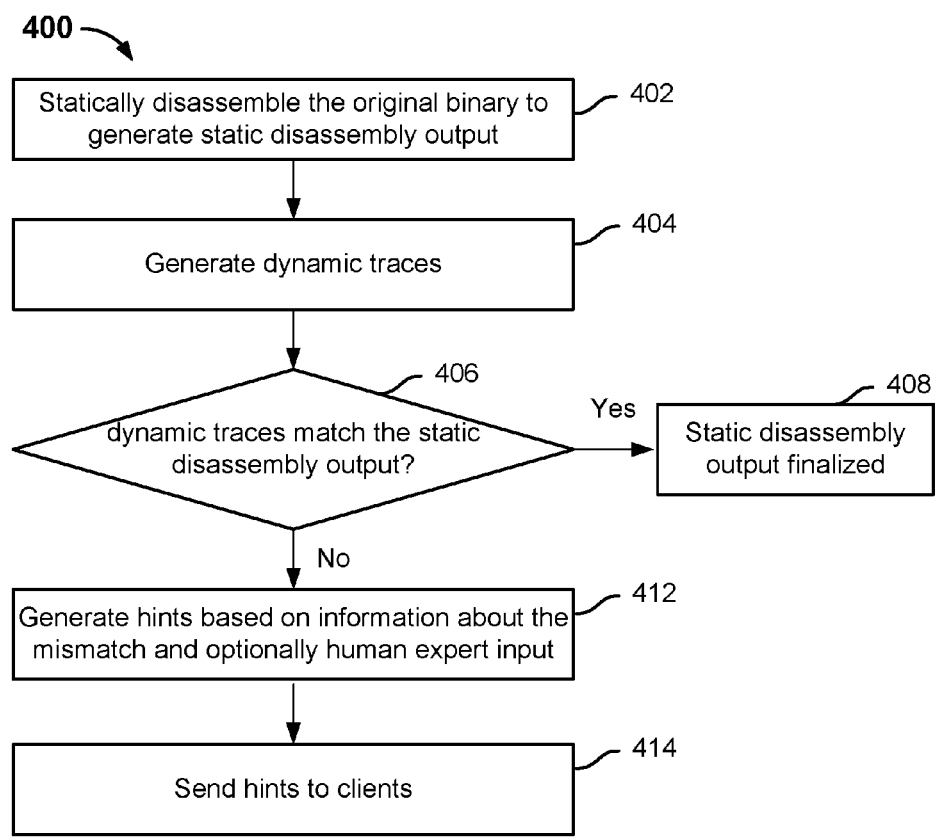
FIG. 4 is a flowchart illustrating an embodiment of a disassembling process.

FIG. 4 is a flowchart illustrating an embodiment of a disassembling process. Process 400 may be performed on a server. The process determines where the static disassembler will fail, how to correct the failure, and generates hints based on this information for the client. At 402, the original binary is statically disassembled to generate static disassembly output, which does not account for runtime conditions and dependencies. At 404, dynamic traces are generated by executing the application using different inputs. In some embodiments, the values of inputs are determined based on profile information fed back by multiple clients. The dynamic traces approximate dynamic execution of the code on the client-side.

At 406, the dynamic traces are compared with the static disassembly output to determine whether there is any mismatch. Specifically, each instruction address in the dynamic trace is compared with a corresponding instruction address in the static disassembly. At 408, if the instruction addresses of the static disassembly output and the dynamic trace match, the corresponding portions of the static disassembly output are deemed correct and are finalized. If, however, the instruction addresses do not match, the static disassembly output is deemed to be out of synch at this location. When there are mismatches between the static disassembly output and the dynamic traces, one or more hints are generated at 412, based on information about the mismatch. Optionally, human expert input information is also received and used for generating the hints. The hints are stored in hint database 112 to be sent to the clients at 414.

Figure 5:
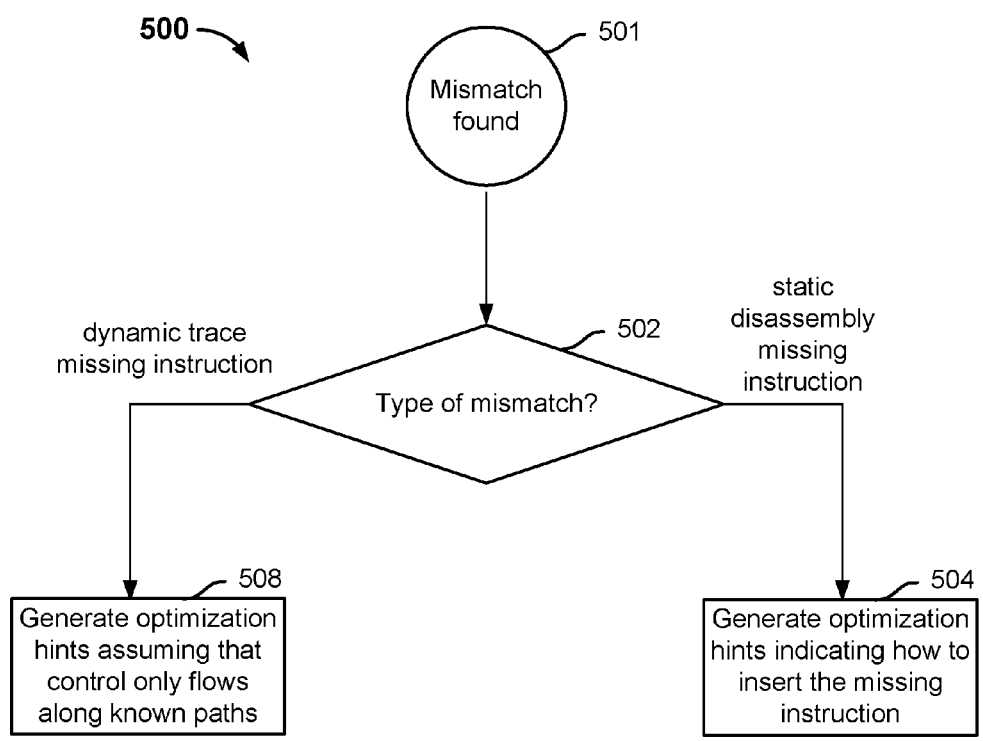
FIG. 5 is a flowchart illustrating an embodiment of a process for generating hints based on mismatch information.

FIG. 5 is a flowchart illustrating an embodiment of a process for generating hints based on mismatch information. Process 500 may be used to implement 412 of process 400. Process initiates when, for example, 406 of process 400 is performed and it is determined that there is mismatch between the dynamic trace and the static trace. When mismatch is found at 501, the type of mismatch between the static disassembly output and the dynamic trace is determined at 502.

One type of mismatch occurs because the static disassembly is missing an instruction that exists at a specific address in the dynamic trace. Assuming that the static disassembler uses a disassembly method that only disassembles statically reachable code, this type of mismatch can happen with instructions that are only reachable through indirect jumps. Also, if the alignment of instructions in the code is different from what is expected by the disassembler (for example, due to some piece of data in the middle of the code), the disassembler will go out of sync and several subsequent instructions may also be missing from the static trace.

FIG. 6 illustrates an example where the static disassembly is missing an instruction. In this example, original assembly code 602 is compiled into binary form. Subsequently, the binary is disassembled and the static disassembly output 604 is shown. The original assembly code is intermixed with data. Specifically, the data at labels "LC1" and "LC2" are used as inputs to the two "printf" functions. The static disassembler treats the data at "LC1" and "LC2" as instructions because it is unable to distinguish between these data and possible instructions. Consequently, the "movl" instruction, which is expected to be at memory location 0x401164, is missing from the statically disassembled code.

Returning to FIG. 5, at 504, one or more hints are generated indicating how to fix the missing instruction in the static disassembly on the client-side. Specifically, the hints include information about how to insert the missing instruction in the static trace, the location for the insertion, and the location for the static disassembly to be restarted. Referring to the example shown in FIG. 6, the hints indicate that to fix the mismatch, the disassembler should resume disassembling at 0x401164. This will result in the successful disassembly of the "movl" instruction and subsequent instructions.

Returning to FIG. 5, another type of mismatch between static disassembly and dynamic trace instructions occurs because the dynamic trace is missing an instruction that exists at a specific address in the static disassembly. This may occur because the execution simply never reaches the missing instruction (e.g., the missing instruction was the target of a branch that was never taken).

FIG. 7 is a code diagram illustrating an example where the dynamic trace is missing an instruction. The original C abs function returning the absolute value of an input x is shown as 702. The static disassembly output and the dynamic trace are shown as 704 and 706, respectively. The execution path of the abs function, which returns the absolute value of an input value, depends on the sign of the input value. In the example shown, based on profile information gathered from multiple clients, all inputs that are used to generate the dynamic trace are positive; therefore, the dynamic trace does not reach the part of code that handles negative input values. Accordingly, four instructions are missing from the dynamic trace (i.e., 0x400541, 0x400544, 0x400546, and 0x400548).

Returning to FIG. 5, in process 500, when the dynamic trace is missing an instruction because execution never reaches the missing instruction (i.e., certain paths are known but never executed), transformation hints are generated indicating the known paths of the control flow, at 508. In the example of the abs function shown in FIG. 7, the hints indicate that assuming that only positive inputs are received, the previously identified four instructions associated with handling negative input values are omitted for purposes of optimization.

Once the hints are generated, the static disassembler continues the checking process and process 500 is repeated if another mismatch is found.

On the client side, optimization is performed based on the hints received from the server. Execution of optimized code generally proceeds along paths known by the server. If, however, an unknown path is encountered during execution, the original program code may be executed instead. In some embodiments, the client-side tool makes modifications to the optimized code to make it safe for execution, including static changes in the binary and run-time checks to perform necessary fixes if an unknown path becomes executed.

In some embodiments, the following measures are taken to ensure correct disassembly and execution on the client:

1. For all jumps and branches in the dynamic trace on the server-side, the server keeps track of all destinations. These destinations are embedded into the hint and are sent to the client. In the generated code on the client-side, checks are added to prevent the program from jumping to an unknown location. During execution on the client, if the execution attempts to take a path other than the predetermined paths (for example, jumping or branching to an unknown destination), the optimized execution is aborted and the program is restarted in the unoptimized mode to execute the original code.

In some embodiments, the client is further configured to provide feedback to the server about the unsuccessful execution of the optimized code, notifying the server of the situation or input which led to the unexpected path. This feedback can be in several forms. One way is to enable the dynamic translator on the client side and generate a dynamic trace of the original program execution on the client. This dynamic trace is later sent to the server, so that the developers on the server side can determine the region of the code that was previously unseen. Another alternative is to simply note the point at which execution reverted to the original code, if this point is known (e.g., an explicit check failed), and send this to the server. This would be lighter-weight than an entire trace.

2. All move instructions that are relative to the program counter or have an immediate address as the operand are changed to point to the original code section, except for ones that feed the address operand of a jump instruction. If a move instruction points to some data in the code section, changing the address makes the instruction point to the correct data. An exception is needed because if the move instruction generates an address for a jump instruction, changing the address would cause the program to jump to the original code section, which is undesirable behavior. To remedy this problem, the server keeps track of all possible jump destinations so that if the client changes a move that later causes a jump to an unknown address, the server will know that it should not change the move instruction.

3. Jumps using the immediate address are changed to jump to the new optimized code sections.

4. Since indirect jumps may target the original code, the execution permission on all original code pages should be revoked. Therefore, if the optimized code jumps to somewhere in the original code by mistake, a page fault is taken and the fault handler can fix the problem, for example by redirecting control to the corresponding optimized code.

In embodiments implementing the above measures, to enable effective execution on the client, the hints include the following information:

1. Addresses of the sections of code to be transformed.

2. Addresses of assembly instructions which have been mistranslated by the static disassembler, and information to bring the disassembler back in sync, for example the address at which to resume disassembly to ensure that subsequent instructions will be disassembled correctly.

3. Addresses of code that has not been executed in the dynamic trace on the server side. If the client encounters these locations during execution, it needs to revert back to the original code.

4. Regions of code that should not be disassembled or transformed (for example, self-modifying code).

The client-server disassembly architecture allows successful disassembly even in the presence of software bugs in the disassembler. So long as the server knows when the disassembler will fail, whether the failure is due to obstacles in the source code (indirect jumps, etc.) or bugs in the disassembler itself, the server is able to issue corrections in the hints to the client. For example, the hint can indicate how to replace certain instructions that contain error with corrected instructions. Since the client tools can self-correct certain bugs, the tools do not need to be bug-free and can be deployed earlier.

Figure 8:
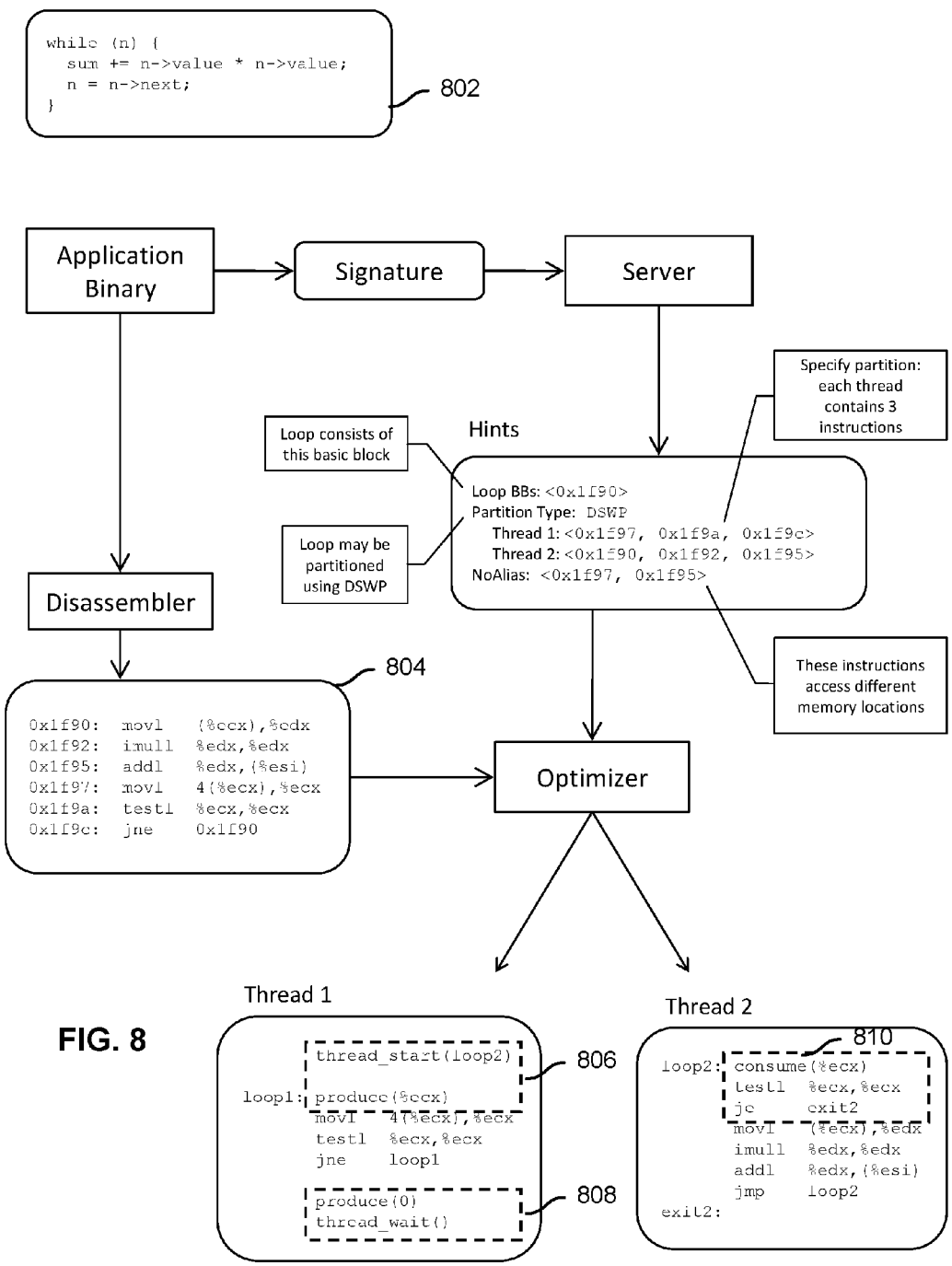
FIG. 8 is a diagram illustrating an example in which a section of code is optimized.

As described above in FIG. 3, the disassembled binary code is further optimized using hints to improve performance. FIG. 8 is a code diagram illustrating an example in which a section of code is optimized. Specifically, loop iteration is parallelized by a client side compiler optimizer using the hints.

A portion of the source code is shown as code segment 802. This loop iterates through a linked list and computes a sum-of-squares of the values in the list. The user does not have access to the source code; rather, it is the binary that will be optimized by the client. A disassembly process is first performed using a process similar to 400. The binary code in x86 assembly is shown as 804.

A transformation that will improve performance is to parallelize the loop to execute on multiple cores. Since the loop walks over a linked list, the loop iterations are dependent and a Decoupled Software Pipelining (DSWP) technique provides a suitable form of parallelization for this loop: one core executes the pointer-chasing instructions while another core executes the computation instructions. Details of the DSWP technique may be found in Decoupled Software Pipelining with the Synchronization Array by Ragan, et al., Proceedings of 13th Conference on Parallel Architecture and Compilation Techniques, 2004, which is incorporated by reference for all purposes. In order for the optimizer to realize the parallelization, it needs to recognize that register %ecx, which holds the linked list pointer, and register %esi, which points to the sum-of-squares, do not point to the same location in memory. In other words, the two memory registers are independent. It may be difficult for the optimizer itself to recognize the memory independence. The server, however, can identify the memory independence based on offline analysis and provide this information in a hint to the client.

To obtain transformation hints for this program, the client tool generates a signature unique to this version of the program and includes the signature in a transformation hint request sent to the server. If the server has seen this signature before and has hints corresponding to the program, it sends these hints back to the client. In this example, the hints include the following information:

1. Basic blocks of the loop (loop BBs): the frequently executed hot loop within the program and the basic blocks that comprise the hot loop. In this case the loop has one basic block: the one that starts at offset 0x1f90.

2. Partition Type: in this example, the optimization used is thread-level parallelization, where instructions in the loop are assigned to different threads. The hint indicates the type of code partitioning for extracting thread-level parallelism. Here, DSWP is the particular style of parallelization best suited for this loop.

3. Partition contents: Given that the loop is being parallelized with a DSWP-style partition, the rest of the hint includes information about which instructions are assigned to which thread. In this example, the pointer-chasing instructions are assigned to Thread 1, while the computation instructions are assigned to Thread 2.

4. No memory aliasing (NoAlias). For an effective DSWP partition, the dependences across threads should be acyclic. In this example, there should be no dependence from Thread 2 to Thread 1. Specifically, the hint informs the client optimizer that there is no dependence between the store to %esi in Thread 2 and the load from %ecx in Thread 1.

Based on the information included in the hints, the optimizer on the client side takes the original program, disassemble it, locate the hot loop, and partition the loop across two threads. The optimizer still uses standard compiler/optimizer techniques to transform certain aspects of the code, such as where to insert synchronization and communication between the threads (shown in regions 806-810). Since the information needed by the optimizer to perform these standard analyses is already available on the client side, it is not necessary for the server to provide this information. Information about hot loops and instruction partitions, however, is dependent on profile information (and in some cases manual parallelization) unavailable to the client; thus, this information is best obtained from the server in the form of hints. Similarly, alias information may be difficult or impossible to obtain with client-only analysis, and therefore require more heavy-weight server-side analysis and/or annotations by a human expert.

The parallelism that can be automatically extracted from a sequential application is often limited by the way the program is specified. In other words, sequential code specifies a single legal program outcome (namely, the result of executing that sequential program), which limits the amount of parallelism that can be exploited because of the need to respect all dependences and preserve this legal outcome. For example, calls to malloc function should be ordered because malloc function maintains internal state; therefore, changing the order of calls would result in different state. In practice, however, most programs are not affected if the order of calls to malloc changes. Instead, their behavior depends only on the memory allocated, not on the specific value of the pointer that is returned. Thus, multiple program executions in which function calls such as malloc execute in different orders may all be valid. Functions (such as malloc) that may occur in any order are referred to as "commutative."

In order to convey the information about changing execution order to the compiler, a human developer can augment the sequential program with additional information so that the compiler knows that other executions are possible and certain dependences may be safely ignored. In the case of malloc, the function is marked as "commutative," notifying the compiler that calls to that function may occur in any order. This annotation can be stored on the server and sent to the clients in the form of a hint, enabling clients to take advantage of human-generated information during optimization.

Figure 9:
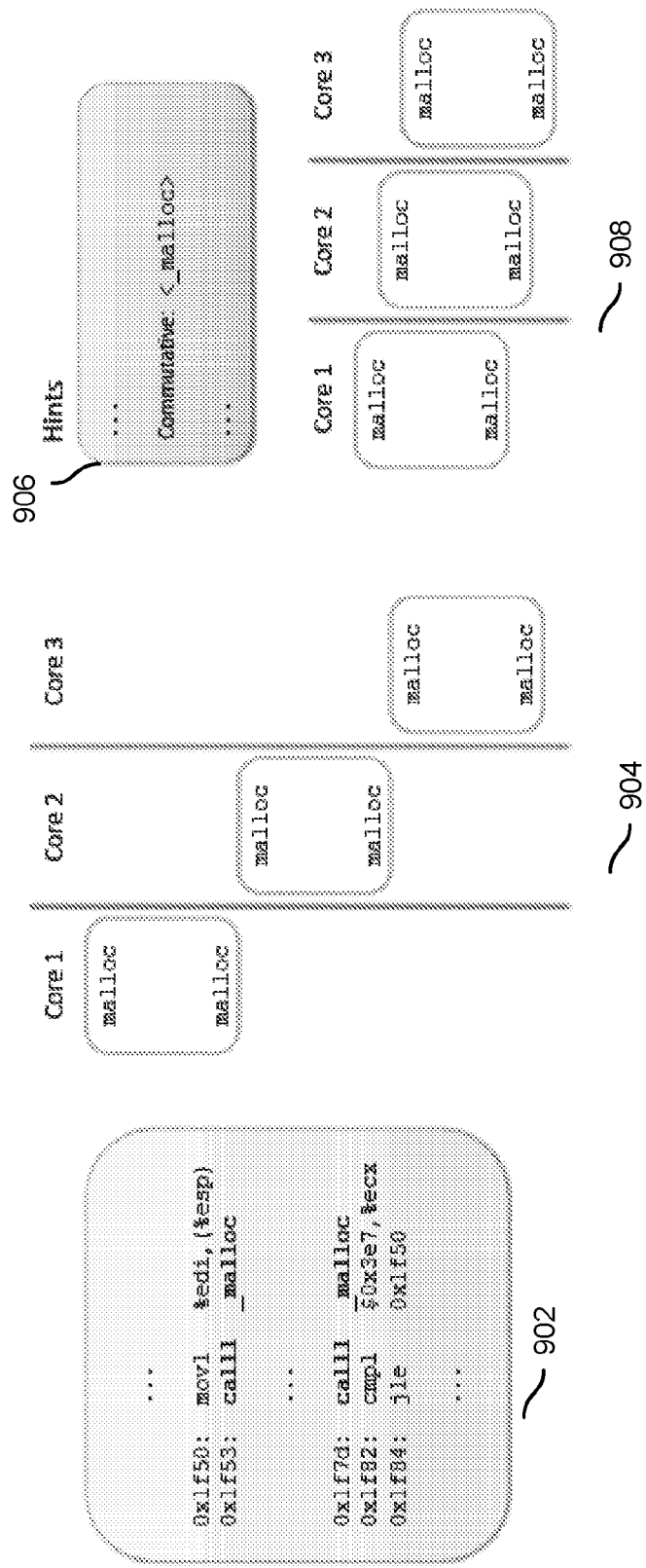
FIG. 9 illustrates an example in which a client obtaining hints that are input by a human expert.

FIG. 9 illustrates an example in which a client obtains hints that are input by a human expert. Code section 902 shows a portion of the disassembled code. In this example, suppose the loop iterations are independent except for two calls to malloc. Parallelism between loop iterations is restricted because malloc manipulates shared data (e.g., the free list) and therefore there is a true dependence: as illustrated the execution diagram 904, the first malloc in the second loop iteration may not execute until the last malloc in the first iteration has completed, even on a device supporting multiple cores. In reality, however, the program output may not depend on the ordering between mallocs in different loop iterations. Thus, the functions may be marked as "commutative" by an expert user on the server side. As shown in hints diagram 906, hints are generated based on the user input, indicating the commutative nature of the malloc function. The hints are sent to the client. Upon receiving hints indicating that the malloc functions are communicative, the client-side optimizer ignores any dependencies between the calls in the loop and parallelizes the loop to execute separate iterations on separate processor cores as shown in execution diagram 908.

Cooperative program code transformation has been described. The client-server architecture described above utilizes transformation hints to achieve optimization without significant impact on the performance of the program.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A cooperative program code transformation method comprising:
   receiving, at a server, a transformation hint request that is sent by a client;
   obtaining, from a database comprising a plurality of transformation hints associated with a plurality of corresponding sets of program code, a suitable transformation hint for a set of program code, wherein:
      the suitable transformation hint comprises information pertaining to one or more of:
         a mismatch of an instruction address of a dynamic trace of the set of program code and a corresponding instruction address in a statically disassembled output of the set of program code; or
         a region in which at least a portion of the set of program code is to be ignored by a client-side disassembler in subsequent transformations;
      and the suitable transformation hint is generated based at least in part on profile information comprising one or more of:
         basic block execution counts;
         memory dependence information; or
         control flow information;
   providing the suitable transformation hint generated based at least in part on the profile information to the client, wherein the suitable transformation hint generated based at least in part on the profile information is used by the client to transform at least a portion of the program code and generate optimized code.

2. The method of claim 1, wherein the suitable transformation hint is identified among the plurality of transformation hints associated with the plurality of corresponding sets of program code.

3. The method of claim 1, wherein the optimized code has better performance than the program code.

4. The method of claim 1, wherein the optimized code consumes less power than the program code.

5. The method of claim 1, wherein program code includes binary code.

6. The method of claim 1, wherein the suitable transformation hint is generated by a human expert.

7. The method of claim 1, further comprising receiving feedback from the client.

8. The method of claim 7, wherein the feedback includes profile information.

9. The method of claim 8, wherein the profile information includes control flow information.

10. The method of claim 8, wherein the profile information includes memory dependence information.

11. The method of claim 1, wherein identifying the suitable transformation hint includes looking up the suitable transformation hint among the plurality of transformation hints using a signature that is derived based at least in part on at least a portion of the program code.

12. The method of claim 1, further comprising deriving the transformation hint.

13. The method of claim 1, wherein the suitable transformation hint is derived based at least in part on feedback information.

14. The method of claim 1, wherein the suitable transformation hint indicates how to perform an optimization in the program code.

15. The method of claim 1, wherein the suitable transformation hint indicates a property of the code.

16. The method of claim 1, wherein the suitable transformation hint indicates how to reliably disassemble the program code.

17. The method of claim 1, wherein the suitable transformation hint includes an address of a region of code to be disassembled.

18. The method of claim 1, wherein the suitable transformation hint includes an address of code that is known to be mistranslated by a static disassembler.

19. The method of claim 1, wherein the suitable transformation hint indicates to a client executing the optimized code of validity of code addresses.

20. The method of claim 1, where the suitable transformation hint includes an address of a region of the program code to be optimized.

21. The method of claim 1, wherein the suitable transformation hint is used to automatically parallelize at least a portion of the program code.

22. The method of claim 1, wherein the suitable transformation hint indicates a type of optimization to be performed.

23. The method of claim 1, wherein the suitable transformation hint indicates a type of code partitioning for extracting thread-level parallelism.

24. The method of claim 1, wherein the suitable transformation hint indicates assignment of instructions to threads.

25. The method of claim 1, wherein the set of one or more suitable transformation hints further includes one or more addresses of code that has not been executed in a dynamic trace on the server.

26. The method of claim 1, further comprising receiving from the client statistics about dynamic characteristics collected during run-time of the set of program code.

27. A cooperative program code transformation system comprising: one or more processors configured to:
receive a transformation hint request that is sent by a client;
obtain, from a database comprising a plurality of transformation hints associated with a plurality of corresponding sets of program code, a suitable transformation hint for a set of program code, wherein:
the suitable transformation hint comprises information pertaining to one or more of:
a mismatch of an instruction address of a dynamic trace of the set of program code and a corresponding instruction address in a statically disassembled output of the set of program code; or
a region in which at least a portion of the set of program code is to be ignored by a client-side disassembler in subsequent transformations;
and the suitable transformation hint is generated based at least in part on profile information comprising one or more of:
basic block execution counts;
memory dependence information; or
control flow information;
provide the suitable transformation hint generated based at least in part on the profile information to the client, wherein the suitable transformation hint generated based at least in part on the profile information is used by the client to transform at least a portion of the program code and generate optimized code; and
one or more memories coupled to the one or more processors and configured to provide the one or more processor with instructions.

28. The system of claim 27, wherein the one or more processors are further configured to receive from the client statistics about dynamic characteristics collected during run-time of the set of program code.

29. A computer program product for cooperative program code transformation, the computer program product being embodied in a tangible non-transitory computer readable storage medium and comprising computer instructions for:
receiving a transformation hint request that is sent by a client;
obtaining, from a database comprising a plurality of transformation hints associated with a plurality of corresponding sets of program code, a suitable transformation hint for a set of program code, wherein:
the suitable transformation hint comprises information pertaining to one or more of:
a mismatch of an instruction address of a dynamic trace of the set of program code and a corresponding instruction address in a statically disassembled output of the set of program code; or
a region in which at least a portion of the set of program code is to be ignored by a client-side disassembler in subsequent transformations;
and the suitable transformation hint is generated based at least in part on profile information comprising one or more of:
basic block execution counts;
memory dependence information; or
control flow information;
providing the suitable transformation hint generated based at least in part on the profile information to the client, wherein the suitable transformation hint generated based at least in part on the profile information is used by the client to transform at least a portion of the program code and generate optimized code.

30. The computer program product of claim 29, further comprising computer instructions for receiving from the client statistics about dynamic characteristics collected during run-time of the set of program code.

31. A cooperative program code transformation method comprising:
obtaining, by a client, a transformation hint from a server, the transformation hint indicating a transformation of a set of program code, wherein:
the transformation hint comprises information pertaining to one or more of:
a mismatch of an instruction address of a dynamic trace of the set of program code and a corresponding instruction address in a statically disassembled output of the set of program code; or
a region in which at least a portion of the set of program code is to be ignored by a client-side disassembler in subsequent transformations;
and the transformation hint is generated based at least in part on profile information comprising one or more of:
basic block execution counts;
memory dependence information; or
control flow information;
transforming the program code based at least in part on the transformation hint generated based at least in part on the profile information, to:
generate optimized code at the client; and
execute the optimized code at the client.

32. The method of claim 31, wherein obtaining the transformation hint includes determining a signature associated with the program code, and requesting for the transformation hint associated with the signature.

33. The method of claim 31, further comprising: collecting statistics about dynamic characteristics during run-time of the set of program code; and sending the statistics to the server.

\* \* \* \* \*